United States Patent
Shin et al.

(10) Patent No.: US 9,487,172 B2
(45) Date of Patent: Nov. 8, 2016

(54) IMAGE DISPLAY DEVICE AND METHOD THEREOF

(75) Inventors: Jeongeun Shin, Seoul (KR); Junbum Park, Suwon-Si (KR); Hansung Lee, Seoul (KR); Seungman Kim, Gyeonggi-Do (KR); Sungjea Ko, Seoul (KR); Hyokak Kim, Seoul (KR); Bosang Kim, Seoul (KR); Keunyung Byun, Gwangju (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 14/343,888

(22) PCT Filed: Mar. 9, 2012

(86) PCT No.: PCT/KR2012/001739
§ 371 (c)(1),
(2), (4) Date: Mar. 10, 2014

(87) PCT Pub. No.: WO2013/133464
PCT Pub. Date: Sep. 12, 2013

(65) Prior Publication Data
US 2015/0002620 A1    Jan. 1, 2015

(51) Int. Cl.
*B60R 21/0134* (2006.01)
*G06K 9/00* (2006.01)
*B60R 1/00* (2006.01)
*B60W 30/095* (2012.01)
*B60K 31/00* (2006.01)
*H04N 5/232* (2006.01)

(52) U.S. Cl.
CPC ....... *B60R 21/0134* (2013.01); *B60K 31/0008* (2013.01); *B60R 1/00* (2013.01); *B60W 30/095* (2013.01); *G06K 9/00805* (2013.01); *H04N 5/23238* (2013.01); *B60R 2300/105* (2013.01); *B60R 2300/70* (2013.01); *B60R 2300/802* (2013.01); *B60R 2300/8093* (2013.01); *B60W 2420/42* (2013.01)

(58) Field of Classification Search
None
See application file for complete search history.

(56) References Cited

U.S. PATENT DOCUMENTS

| 2003/0091228 A1* | 5/2003 | Nagaoka | G06K 9/00651 382/154 |
| 2003/0218542 A1* | 11/2003 | Barendt | G08B 13/19645 340/545.1 |
| 2004/0039632 A1* | 2/2004 | Han | G06Q 20/32 705/13 |

FOREIGN PATENT DOCUMENTS

| JP | 2007-251257 A | 9/2007 |
| JP | 2011-095977 A | 5/2011 |
| KR | 10-2003-0010891 A | 2/2003 |

OTHER PUBLICATIONS

International Search Report dated Nov. 28, 2012 for Application No. PCT/KR2012/001739, 2 pages.

*Primary Examiner* — Michael Teitelbaum
(74) *Attorney, Agent, or Firm* — Fish & Richardson P.C.

(57) ABSTRACT

Disclosed are an image display device and a method thereof capable of detecting a distance between an obstacle included in a distorted image captured by a wide angle camera and a vehicle to thus prevent an occurrence of an accident in which the vehicle collides with the obstacle so as to damaged, in advance. The image display device includes: a storage unit configured to store obstacle characteristic images previously captured from multiple viewpoints; an image capture unit configured to capture images of a surrounding area of a vehicle; a controller configured to detect an obstacle from the captured images on the basis of the images captured by the image capture unit and the obstacle characteristic images, and generate warning information when a distance value between the vehicle and the obstacle is equal to or smaller than a first pre-set distance value; and a display unit configured to display the generated warning information.

33 Claims, 10 Drawing Sheets

IMAGE DISPLAY DEVICE AND METHOD THEREOF

CROSS REFERENCE TO RELATED APPLICATIONS

This application is a U.S. National Phase Application under 35 U.S.C. §371 of International Application PCT/KR2012/001739, filed on Mar. 9, 2012, the entire content of which is hereby incorporated by reference in its entirety.

TECHNICAL FIELD

The present invention relates to an image display device and a method thereof.

BACKGROUND ART

In general, an image display device captures an image of a subject according to a user request and displays the captured image of the subject on a display unit. For example, a black box recording a driving state or a surrounding situation by using a camera mounted in a vehicle, a parking assistance system capturing an image of the rear side by using a camera installed at the rear side of a vehicle when the vehicle is backed up and outputting the captured image to a display device within the vehicle, and the like, are used, and this trend is increasing.

Meanwhile, among such technologies, a system of capturing certain images by using wide angle cameras installed at front, rear, and left, and right sides of a vehicle, reconfiguring images captured by the cameras into images in such a form that the images are looked over immediately from an upper side of the vehicle, namely, in a downward direction, and outputting the reconfigured images to a display device of the vehicle has been proposed to enhance driver convenience. This system is called a bird-eye view system in the aspect that it provides an image as if bird eyes view from the sky, an around view monitoring (AVM) system, or the like. This technique employs a wide angle camera having a fish eye lens to secure a wide viewing angle, and here, the use of a wide angle camera obtains a distorted image as a first image, which, thus, requires a process of correcting the distorted image into a distortion-free image (i.e., an image without distortion). As the related art, Korean Patent Application No. 10-2010-0049626 discloses an apparatus and method for processing a wide angle image.

DISCLOSURE OF INVENTION

Solution to Problem

Therefore, an aspect of the present invention provides an image display device and a method thereof capable of detecting a distance between an obstacle included in a distorted image captured by a wide angle camera and a vehicle to thus prevent an occurrence of an accident in which the vehicle collides with the obstacle so as to damaged, in advance.

According to an aspect of the present invention, there is provided an image display device including: an image capture unit configured to capture images of a surrounding area of a vehicle; a controller configured to detect an obstacle from the captured images on the basis of the images captured by the image capture unit and obstacle characteristic images, and generate warning information when a distance value between the vehicle and the obstacle is equal to or smaller than a first pre-set distance value; and a display unit configured to display the generated warning information.

In an example in relation to the present disclosure, the image capture unit may include a plurality of wide angle cameras, and the previously captured obstacle characteristic images may be multi-view obstacle characteristic images previously captured through the plurality of wide angle cameras.

In an example in relation to the present disclosure, the multi-view obstacle characteristic images may include any one or more of an image of a wheel of the vehicle, an image of a side mirror of the vehicle, an image of a window of the vehicle, an image of a bumper of the vehicle, an image of a handle of the vehicle, and an image of the license number plate of the vehicle.

In an example in relation to the present disclosure, when a plurality of obstacle characteristic images are detected from the captured images, the controller may display an obstacle characteristic image which is the nearest (or the most adjacent) to the vehicle among the plurality of obstacle characteristic images, as the warning information on the display unit.

In an example in relation to the present disclosure, the controller may further display a position of the most adjacent obstacle characteristic image and a distance between the vehicle and the most adjacent obstacle characteristic image on the display unit.

In an example in relation to the present disclosure, in indicating (or displaying) a virtual parking line on the basis of a rotation angle of the wheel of the vehicle and a traveling direction on the display unit, the controller may display a virtual parking line avoiding the obstacle on the display unit.

In an example in relation to the present disclosure, after the obstacle characteristic images are detected from the captured images, when a position relation between the detected obstacle characteristic images is identical to a pre-set position relation, the controller may determine the detected obstacle characteristic images as obstacles.

In an example in relation to the present disclosure, the controller may calculate distances between the vehicle and the determined respective obstacles, select the smallest distance value from among the calculated distance values, and generate the warning information when the smallest distance value is equal to or smaller than the first pre-set distance value.

In an example in relation to the present disclosure, the controller may detect first and second obstacles from the captured images, and when a distance between the first and second obstacles is greater than a second pre-set distance, the controller may select an obstacle corresponding to a pre-set position from among the first and second obstacles and indicate (or display) a virtual parking line on the captured image such that the selected obstacle and the virtual parking line adjacent to the selected obstacle are separated by a third pre-set distance.

In an example in relation to the present disclosure, the second pre-set distance may include a breadth of the vehicle and a distance required for a passenger or a driver to get into or get out of the vehicle.

In an example in relation to the present disclosure, the obstacle corresponding to the pre-set position may be an obstacle which is most adjacent to the door of the vehicle, among the first and second obstacles.

According to another aspect of the present invention, there is provided an image display method including: capturing images of a surrounding area through an image capture unit; detecting an obstacle from the captured images on the basis of the images captured by the image capture unit and obstacle characteristic images, and generating warning information when a distance value between the vehicle and the obstacle is equal to or smaller than a first pre-set distance value; and displaying the generated warning information on a display unit.

BEST MODE FOR CARRYING OUT THE INVENTION

Figure 1:
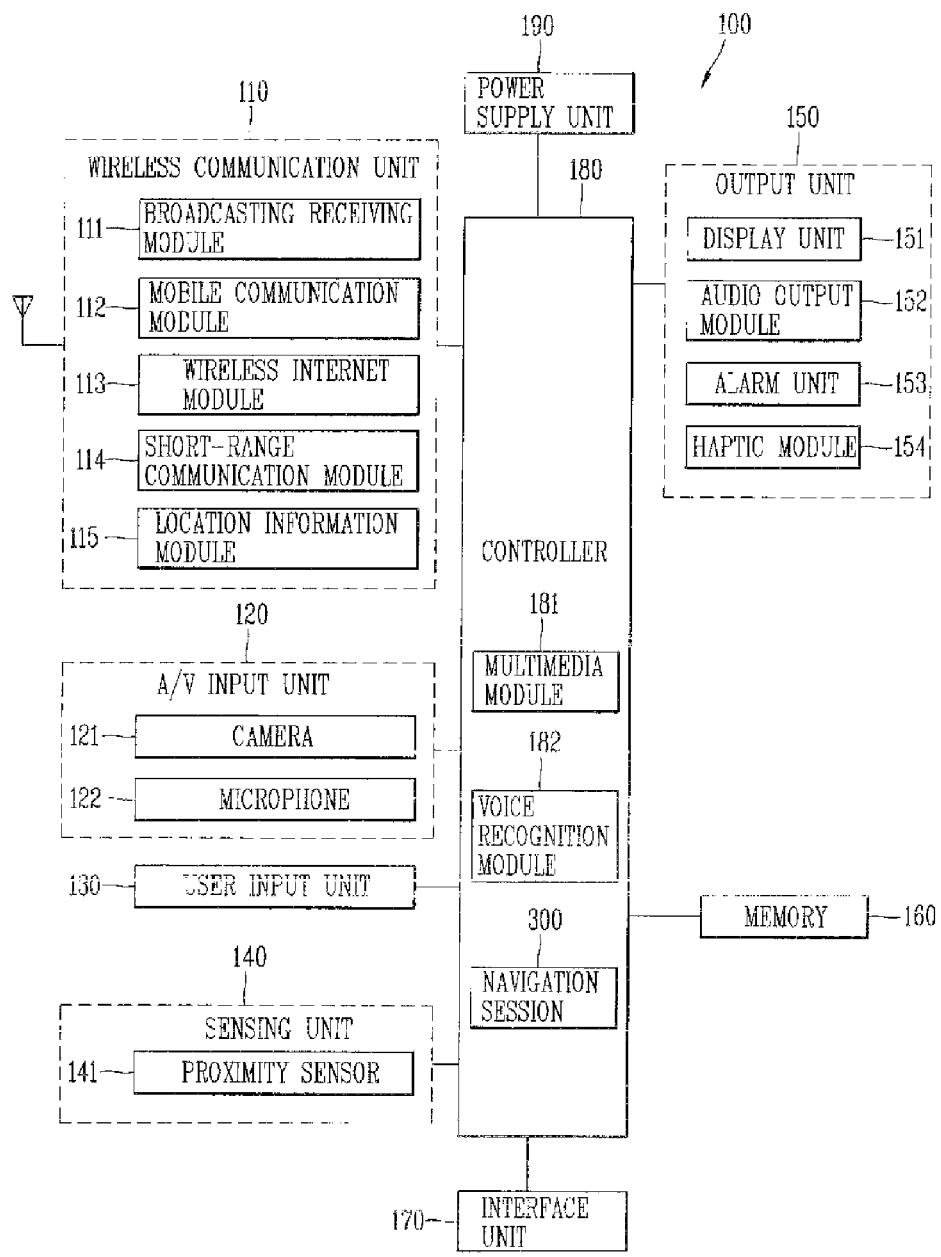
FIG. 1 is a schematic block diagram showing the configuration of a mobile communication terminal employing an image display device according to embodiments of the present invention.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The exemplary embodiments of the present invention will now be described with reference to the accompanying drawings, in which like numbers refer to like elements throughout.

In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Hereinafter, an image display device and method capable of detecting an obstacle from distorted images (e.g., barrel images) captured by wide angle cameras which are able to secure a wide viewing angle without correcting the distorted images, and detecting a distance between a vehicle and the obstacle, to thus prevent an occurrence of an accident in which the vehicle collides with the obstacle and thus is damaged, in advance, according to embodiments of the present invention will be described in detail with reference to FIGS. 1 to 12.

FIG. 1 is a view showing the configuration of a mobile communication terminal employing an image display device according to embodiments of the present invention. A mobile communication terminal (or a mobile phone) 100 may be implemented in various forms such as mobile phones, smart phones, notebook computers, digital broadcast terminals, PDAs (Personal Digital Assistants), PMPs (Portable Multimedia Player), etc.

As shown in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capturing device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile communication terminal 100 or may be used to transfer data within the mobile communication terminal to an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

When the display unit 151 and the touch pad are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

A proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected on the basis of a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input.

Through the vibration, the user may recognize the occurrence of an event. A signal for notifying about the occurrence of an event may be output to the display unit 151 or to the voice output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as identifying device, hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 recognizes a voice pronounced by the user and performs a corresponding function according to the recognized voice signal.

A navigation session 300 applied to the mobile terminal 100 displays a travel route on map data.

Meanwhile, the image display device employed in the mobile communication terminal 100 may include: a memory 160 configured to store obstacle characteristic images previously captured from multiple viewpoints; a camera 121 configured to capture images of a surrounding area of a vehicle; a controller 180 configured to detect an obstacle from the captured images on the basis of the images captured by the camera 121 and the obstacle characteristic images, and generate warning information when a distance value between the vehicle and the obstacle is equal to or smaller than a first pre-set distance value; and a display unit 151 configured to display the generated warning information.

The image display device and method according to first to third embodiments of the present invention will now be described in detail.

Figure 2:
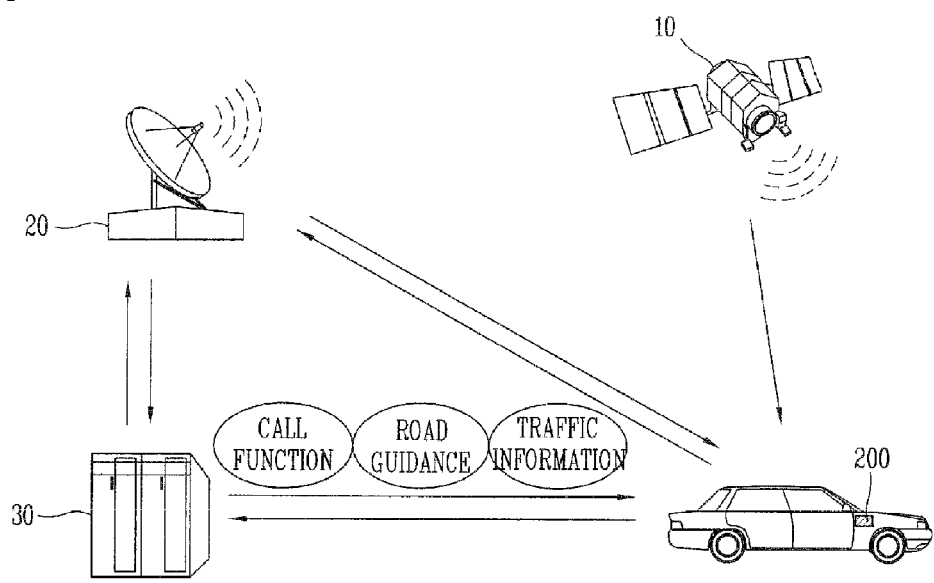
FIG. 2 is a view showing a vehicle navigation system employing an image display device according to embodiments of the present invention.

FIG. 2 is a view showing a vehicle navigation system employing an image display device according to embodiments of the present invention.

As shown in FIG. 2, a vehicle navigation system includes an information providing center 30 providing traffic information and various types of data (e.g. a program, an execution file, and the like); and a telematics terminal 200 mounted within a vehicle, receiving traffic information through a wide area wireless communication network 20 and/or a local area wireless communication network, and providing a road guidance service on the basis of an artificial satellite 10. Here, the communication network may further include a wired/wireless communication network such as a local area network (LAN) or a wide area network (WAN).

Through the communication network, various types of traffic information (e.g., road traffic information, information regarding a point of interest (POI)) including information regarding a traffic light, are collected, and the collected information is processed by an information providing center 30 (e.g., a server) according to a TPEG (Transport Protocol Expert Group) standard and transmitted to a broadcast station. Then, the broadcast station inserts the traffic information including the information regarding a traffic light into a broadcast signal and broadcasts it to the vehicle 200. Here, the information regarding a traffic light may be received from a server (not shown) installed in the traffic light when the vehicle approaches the traffic light.

The server reconfigures various types of traffic information, which are collected through various paths connected to the communication network, for example, according to an operator input, through the wired/wireless Internet, from digital broadcast services such as a TDC (Transparent Data Channel) or a MOC (Multimedia Object Transport), from a different server, or from a probe car, into a traffic information format such as a format in conformity with a TPEG (Transport Protocol Expert Group) standard, namely, for example, a standard for a traffic information service, and transmits the same to the broadcast station.

The server may generate a traffic information format on the basis of the TPEG standard including traffic light information, and transmit the same to the broadcast station.

The broadcast station includes the traffic information including traffic light information, which has been received from the server, in a broadcast signal and wirelessly transmits the same, so that a traffic information reception terminal, e.g., a navigation device, mounted in the vehicle 200, or the like, can receive the same. The traffic information includes the traffic light information, and may include information regarding various traffic conditions required for vehicle driving in roads, sea traffic, airline flights, such as accidents, a road situation, traffic congestion, road construction, road blockage (or road closure), a public transportation network delay, air transportation holdup, and the like.

The broadcast station receives the processed traffic information including traffic light information from the server and transmits it through digital signals in conformity with various digital broadcast standards to the vehicle 200. In this case, the broadcast standards include a European digital audio broadcasting (DAB) standard on the basis of Eureca-147 [ETSI EN 300 401), a terrestrial or satellite digital multimedia broadcasting (DMB) standard, a terrestrial digital video broadcasting (DVB-T) standard, a mobile digital video broadcasting-handheld (DVB-H) standard, media forward link only (MFLO) standard, and the like.

Also, the broadcast station may transmit the traffic information including the traffic light information through a wired/wireless network such as the wired/wireless Internet.

The vehicle 200 refers to every carrier, such as general automobiles, buses, trains, ships, airplanes, and the like, implemented by using a mechanic, electronic device for the purpose of transporting people or objects.

The vehicle 200 includes a traffic information reception terminal mounted therein, receives traffic light information from the broadcast station by using the mounted traffic information reception terminal, processes the traffic light information, and transfers the processed traffic light information to a corresponding user through graphics, text, and/or audio.

Hereinafter, the configuration of the telematics terminal 200 employing the image display device according to embodiments of the present invention will be described with reference to FIG. 3.

Figure 3:
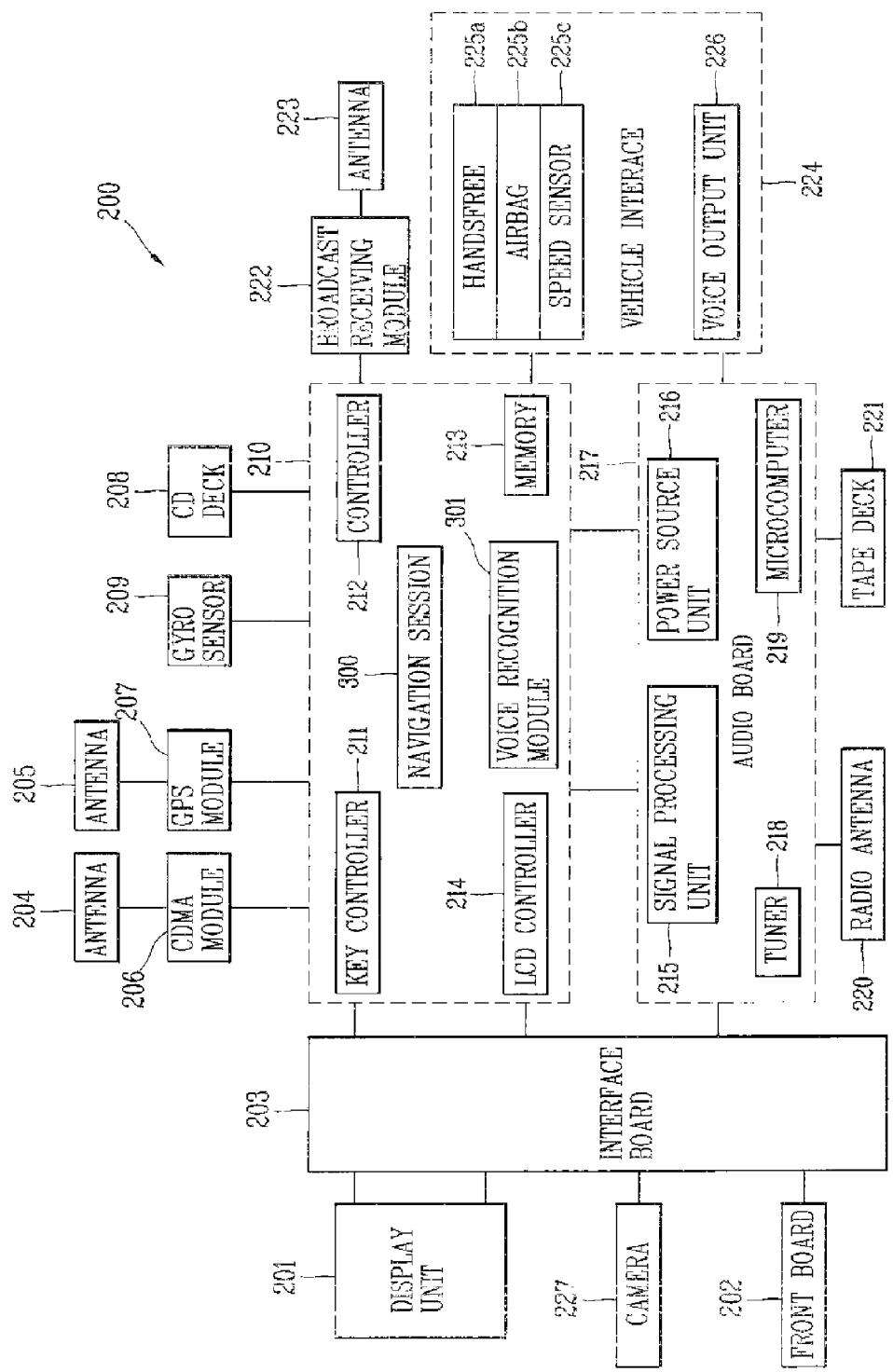
FIG. 3 is a schematic block diagram showing the configuration of a telematics terminal employing an image display device according to embodiments of the present invention.

FIG. 3 is a schematic block diagram showing the configuration of a telematics terminal employing an image display device according to embodiments of the present invention.

As shown in FIG. 3, the telematics terminal 200 includes a main board 210 including a controller (e.g., a central processing unit (CPU)) 212 for controlling the telematics terminal 200 on the whole, a memory 213 for storing various types of information, a key controller 211 for controlling various key signals, and a liquid crystal display (LCD) controller 214 for controlling an LCD.

The memory 213 stores map information (map data) for displaying road guidance information on a digital map. Also, the memory 213 stores a traffic information collecting control algorithm for inputting traffic information according to the situation of a road in which the vehicle currently travels (runs), and information for controlling the algorithm.

The main board 210 includes a code division multiple access (CDMA) module 206, i.e., a mobile communication terminal having a unique device number as assigned and installed in the vehicle, a global position system (GPS) module 207 for guiding a location of the vehicle, receiving a GPS signal for tracking a travel route from a start point to a destination, or transmitting traffic information collected by the user, as a GPS signal, a CD deck 208 for reproducing a signal recorded in a CD (Compact Disk), a gyro sensor 209, and the like. The CDMA module 206 and the GPS module 207 transmit or receive signals via antennas 204 and 205.

A broadcast receiving module 222 is connected with the main board 210 and receives a broadcast signal via an antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals.

The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A handsfree 225*a* for inputting a voice signal, an airbag 225*b* configured for the security of a passenger, a speed sensor 225*c* for detecting a speed of the vehicle, and the like, may be connected to the vehicle interface 224. The speed sensor 225*c* calculates a vehicle speed and provides the calculated vehicle speed information to the CPU 212.

The navigation session 300 applied to the telematics terminal 200 generates road guidance information on the basis of the map data and current location information of the vehicle and provides the generated road guidance information to a user.

The display unit 201 detects a proximity touch within a display window via a proximity sensor. For example, when a pointer (e.g., user's finger or a stylus) is proximity-touched, the display unit 201 detects the position of the proximity touch and outputs position information corresponding to the detected position to the controller 212.

A voice recognition device (or a voice recognition module) 301 recognizes a voice pronounced by the user and performs a corresponding function according to the recognized voice signal.

The navigation session 300 applied to the telematics terminal 200 displays a travel route on map data, and when the location of the mobile terminal 100 is within a pre-set distance from a blind spot included in the travel route, the navigation session 300 automatically forms a wireless network with a terminal mounted in an adjacent vehicle (e.g., a vehicle navigation device) and/or a mobile communication terminal carried by a nearby pedestrian through wireless communication (e.g., a short-range wireless communication network), to receive location information of the adjacent vehicle from the terminal mounted in the adjacent vehicle and receive location information of the nearby pedestrian from the mobile communication terminal carried by the nearby pedestrian.

Meanwhile, the image display device employed in the telematics terminal 200 may include: a memory 213 configured to store obstacle characteristic images previously captured from multiple viewpoints; a camera 227 configured to capture images of a surrounding area of a vehicle; a controller 210 configured to detect an obstacle from the captured images on the basis of the images captured by the camera 227 and the obstacle characteristic images, and generate warning information when a distance value between the vehicle and the obstacle is equal to or smaller than a first pre-set distance value; and a display unit 201 configured to display the generated warning information.

The image display device and method thereof according to first to third embodiments of the present invention will now be described in detail.

Figure 4:
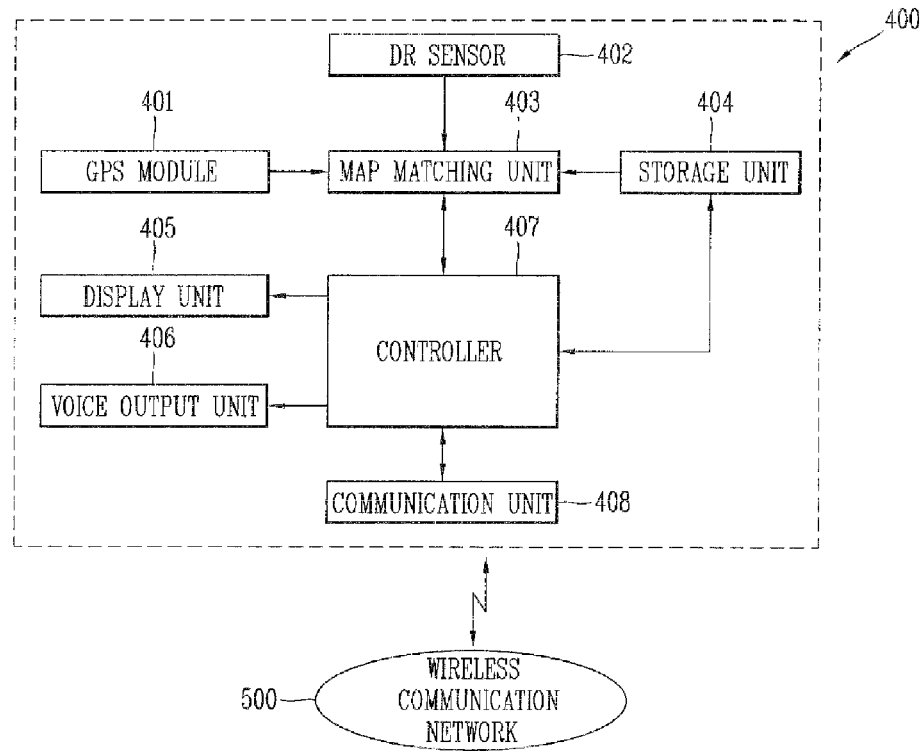
FIG. 4 is a schematic block diagram showing the configuration of a navigation device (or a vehicle navigation device) employing an image display device according to embodiments of the present invention.

FIG. 4 is a schematic block diagram showing the configuration of a navigation device (or a vehicle navigation device) 400 employing the image display device according to embodiments of the present invention.

The navigation device (or a vehicle navigation device) 400 is classified into an in-dash type navigation device and an on-dash type navigation device according to an installation form in the vehicle 200. The in-dash type navigation device (or an in-dash type vehicle navigation device) is inserted in a certain space allocated within a dash board of the vehicle 200 and fixedly mounted. The on-dash type navigation device (or an on-dash type vehicle navigation device) is mounted on a dash board of the vehicle 200 or installed in the vicinity of the dash board by using a support. The on-dash type navigation device (or the on-dash type vehicle navigation device) is detachably mounted, so it can be separated from the vehicle 200 and carried around.

The navigation device (or the vehicle navigation device) 400 according to the present embodiment includes the in-dash type navigation device and the on-dash type navigation device. In addition, the navigation device 400 according to the present embodiment may include any information processing device that can receive and/or process traffic information such as various portable terminals performing a navigation function by interworking with a GPS receiver that receives a navigation message transmitted from a GPS satellite within the vehicle.

As shown in FIG. 4, the navigation device 400 includes a GPS module 401 for receiving a GPS signal from a satellite and generating first vehicle location data of the navigation device (which is regarded to be located at the same location as that of the telematics terminal 200 or the mobile communication terminal 100) on the basis of the received GPS signal; a DR (Dead-Reckoning) sensor 402 for generating second vehicle location data on the basis of a travel direction and the speed of a vehicle; a storage unit (or a memory) 404 for storing map data and various types of information; a map matching unit 403 for generating an estimated vehicle location on the basis of the first vehicle location data and the second vehicle location data, matching the generated estimated vehicle location and a link (map matching link or a map matching road) in the map data stored in the storage unit 404, and outputting the matched map information (map matching results); a communication unit 408 for receiving real time traffic information from an information providing center and/or an adjacent vehicle via a wireless communication network 500, receiving traffic light information, and performing call communication; a controller 407 for generating road guidance information on the basis of the matched map information (map matching results); a display unit 405 for displaying a road guidance map (including information about a point of interest (POI)) included in the road guidance information and the traffic light information; and a voice output unit 406 for outputting road guidance voice information (a road guidance voice message) included in the road guidance information and a voice signal corresponding to the traffic light information.

The communication unit 408 receives a call signal and/or a text message received through a base station, and may include a handsfree having a Bluetooth module and may receive a broadcast signal including traffic information in a TPEG format via an antenna from a broadcast station. The broadcast signal may include traffic information according to a traffic information (TPEG) service or a binary format for scene (BIFS) data service and supplementary information such as various supplementary data, as well as video and audio data in conformity with various standards such as a terrestrial or satellite digital multimedia broadcasting (DMB), digital audio broadcasting (DAB), digital video broadcasting (DVB-T, DVB-H), and the like. Also, the communication unit 408 tunes a signal band at which traffic information is provided, demodulates the tuned signal, and outputs the demodulated signal to a TPEG decoder (included in the controller 407).

The TPEG decoder decodes the traffic information in the TPEG format and provides various types of information such as the traffic light information included in the traffic information to the controller 407.

The road guidance information may include various types of information related to traveling such as lane information, travel (running) limit speed information, turn-by-turn information, traffic safety information, traffic guidance information, vehicle information, road search information, as well as the map data.

The signal (i.e., the location information of the terminal) received via the GPS module 401 may be provided to the navigation device 400 by using a wireless communication scheme such as 802.11, a standard of a wireless network LAN including infrared communication (or infrared data association (IrDA)), and the like, 802.15, a standard for a wireless personal area network (PAN) including Bluetooth™, UWB, ZigBee, and the like, 802.16, a standard for a wireless metropolitan area network (MAN) broadband wireless access (BWA) including a fixed wireless access (FWA), and the like, 802.20, a standard for the mobile Internet with respect to a mobile broadband wireless access (MBWA) including WiBro, WiMAX, and the like, proposed by IEEE (Institute of Electrical and Electronics Engineers).

The navigation device 400 may further include an input unit. The input unit may select a user-desired function or receive information, and various devices such as a keypad, a touch screen, a jog shuttle, a microphone, and the like, may be used as the input unit.

The map matching unit 403 generates a vehicle estimated location on the basis of the first location data and the second location data, and reads map data corresponding to a travel route from the storage unit 404.

The map matching unit 403 matches the vehicle estimated location and a link (road) included in the map data, and outputs the matched map information (map matching results) to the controller 407. For example, the map matching unit 403 generates the vehicle estimated location on the basis of the first location data and the second location data, matches the generated vehicle estimated location and links in the map data stored in the storage unit 404 according to a link sequence, and outputs the matched map information (map matching results) to the controller 407. The map matching unit 403 may output information regarding road attribute information such as one-storied road, duplex-storied road, and the like, included in the matched map information (map matching results). The function of the map matching unit 403 may also be implemented in the controller 407.

The storage unit 404 stores the map data. In this case, the stored map data includes geographic coordinates (or longitude/latitude coordinates) representing the latitude and longitude by DMS (Degree/Minute/Second) unit. Here, besides the geographic coordinates, universal transverse mercator (UTM) coordinates, universal polar system (UPS) coordinates, transverse mercator (TM) coordinates, and the like, may also be used as the stored map data.

The storage unit 404 stores various types of information such as various menu screen images, a point of interest (POI), function characteristic information according to a particular position of map data, and the like.

The storage unit 404 stores various user interfaces (UIs) and/or graphic UIs (GUIs).

The storage unit 404 stores data and programs required for the navigation device 400 to operate.

The storage unit 404 stores destination information input from the user via the input unit. In this case, the destination information may be a destination or one of a destination and a start point.

The display unit 405 displays image information (or the road guidance map) included in the road guidance information generated by the controller 407. Here, the display unit 405 includes a touch sensor (touch screen) and/or a proximity sensor. The road guidance information may include various types of information in relation to traveling (running or driving) such as lane information, running limit speed information, turn-by-turn information, traffic safety information, traffic guidance information, vehicle information, road search information, and the like, as well as the map data.

When displaying the image information, the display unit 405 may display various contents such as various menu screen images, road guidance information, and the like, by using the user interface and/or the graphic user interface included in the storage unit 404. Here, the contents displayed on the display unit 405 may include a menu screen image including various text or image data (including map data or various types of information data), and data such as icons, list menus, combo boxes, and the like.

The voice output unit 406 outputs voice information included in road guidance information (or a voice message with respect to the road guidance information) generated by the controller 407. Here, the voice output unit 406 may be an amplifier or a speaker.

The controller 407 generates the road guidance information on the basis of the matched map information and outputs the generated road guidance information to the display unit 405 and the voice output unit 406. Then, the display unit 405 displays the road guidance information.

The controller 407 receives real time traffic information from the information providing center and/or the terminal (or the vehicle navigation device) mounted in an adjacent vehicle) and generates road guidance information.

The controller 407 may be connected to a call center via the communication unit 408 to perform call communication, or transmit or receive information between the navigation device 400 and the call center. Here, the communication unit 408 may include a handsfree module having a Bluetooth™ function using a short-range radio communication scheme.

Meanwhile, the image display device employed in the navigation device 400 includes; a storage unit 404 configured to store obstacle characteristic images previously captured from multiple viewpoints; a camera (not shown) configured to capture images of a surrounding area of a vehicle; a controller 407 configured to detect an obstacle from the captured images on the basis of the images captured by camera and the obstacle characteristic images, and generate warning information when a distance value between the vehicle and the obstacle is equal to or smaller than a first pre-set distance value; and a display unit 405 configured to display the generated warning information.

The image display device and method thereof according to the first to third embodiments will now be described in detail Hereinafter, the image display device according to embodiments of the present invention will be described with reference to FIG. 5.

The image display device and method thereof according to embodiments of the present invention can be variably applicable to smart phones, desktop computers, notebook computers, digital broadcast terminals, televisions, PDAs (Personal Digital Assistants), PMPs (Portable Multimedia Player), or the like, as well as to the mobile communication terminal (or a mobile phone) 100, the telematics terminal 200, and the navigation device 400.

Figure 5:
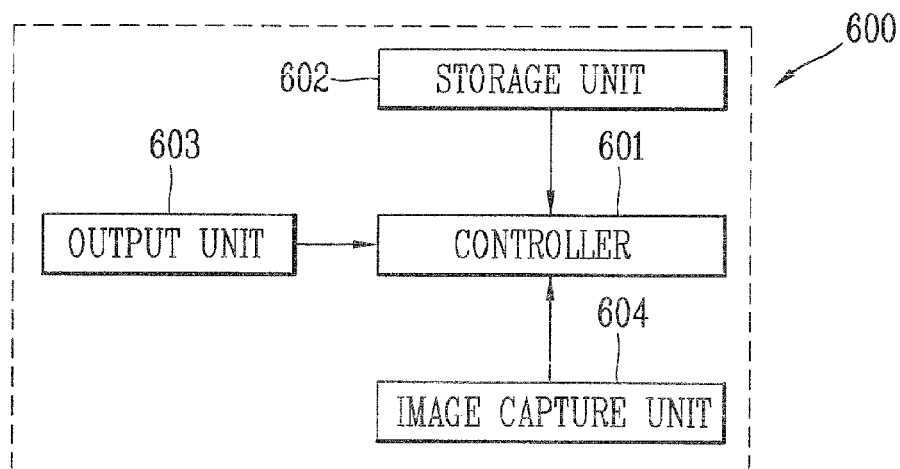
FIG. 5 is schematic block diagram of an image display device according to embodiments of the present invention.

FIG. 5 is schematic block diagram of the image display device according to embodiments of the present invention.

As shown in FIG. 5, the image display device 600 according to embodiments of the present invention includes: a storage unit 602 configured to store obstacle (e.g., a vehicle, a human body, and the like) characteristic images (e.g., a wheel image of a vehicle, an image of a side mirror, an image of a window, an image of a bumper, an image of a vehicle door handle, an image of a vehicle number plate, and the like) previously captured from multiple viewpoints; an image capture unit 604 configured to capture images of a surrounding area of a vehicle and output the captured images corresponding to the surrounding area of the vehicle; a controller 601 configured to detect an obstacle from the captured images on the basis of the captured images and the multi-view obstacle characteristic images, detect a distance value between the vehicle and the obstacle, and generate warning information (e.g., a warning message, a warning voice, a warning image, or the like) when the distance value between the vehicle and the obstacle is equal to or smaller than a pre-set distance value; and an output unit (e.g., a speaker and/or a display unit) 603 configured to output the generated warning information.

The image capture unit 604 may be a wide angle camera capable of securing a wide viewing angle.

The obstacle characteristic images previously captured from multiple viewpoints may be images captured by wide angle cameras capable of securing a wide viewing angle, and the images captured by the wide angle cameras may include distorted images (e.g., barrel images). The obstacle characteristic images previously captured from multiple viewpoints include an image of a wheel of the vehicle captured from multiple viewpoints, an image of a side mirror of the vehicle captured from multiple viewpoints, an image of a vehicle window captured from multiple viewpoints, an image of a bumper of the vehicle captured from multiple viewpoints, an image of a vehicle handle captured from multiple viewpoints, an image of a vehicle number plate captured from multiple viewpoints, and the like.

In order to detect an obstacle (e.g., a vehicle, a human body, or the like) from the distorted images (e.g., barrel images) captured by the wide angle cameras, the controller 601 detects an obstacle from the images captured by the image capture unit 604 by comparing the images (e.g., barrel images) captured by the image capture unit 604 and the obstacle characteristic images (e.g., barrel images) previously captured from multiple viewpoints and stored in the storage unit 602.

When a distance between the vehicle and the obstacle is equal to or smaller than the pre-set distance value (e.g., 30 centimeters to 1 meter), the controller 601 generates warning information (e.g., a warning message, a warning voice, a warning image, or the like) and outputs the generated warning information to the output unit (e.g., the speaker and/or the display unit) 603. The pre-set distance value may be changed by the user or a designer.

The image capture unit 604 may include first to fourth wide angle cameras. The multi-view obstacle characteristic images may be multi-view vehicle characteristic images previously captured through four wide angle cameras mounted in the vehicle.

Figure 6:
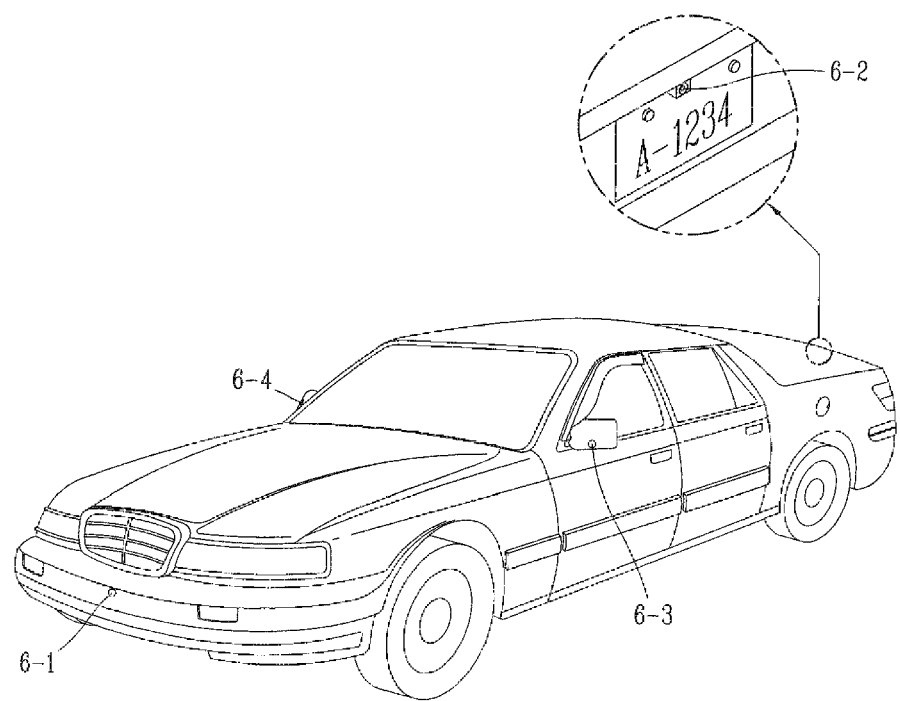
FIG. 6 is a view showing wide angle cameras installed on a vehicle according to a first embodiment of the present invention.

FIG. 6 is a view showing wide angle cameras installed on a vehicle according to a first embodiment of the present invention.

As shown in FIG. 6, a first wide angle camera 6-1 is fixedly installed at the center of a front bumper of the vehicle to capture a front image of the vehicle. A second wide angle camera 6-2 is fixedly installed at the center of a rear bumper of the vehicle to capture a rear image of the vehicle. A third wide angle camera 6-3 is fixedly installed at the center of a left side mirror of the vehicle to capture a left image of the vehicle. A fourth wide angle camera 6-4 is fixedly installed at the center of a right side mirror of the vehicle to capture a right image of the vehicle. Here, as for the installation positions of the first to fourth cameras, the first to fourth cameras may be installed at various positions by a designer.

The image capture unit 604 outputs images corresponding to four directions of the vehicle (e.g., a front image, a rear image, a leftward directional image, a rightward directional image of the vehicle) to the controller 601 in real time.

Figure 7:
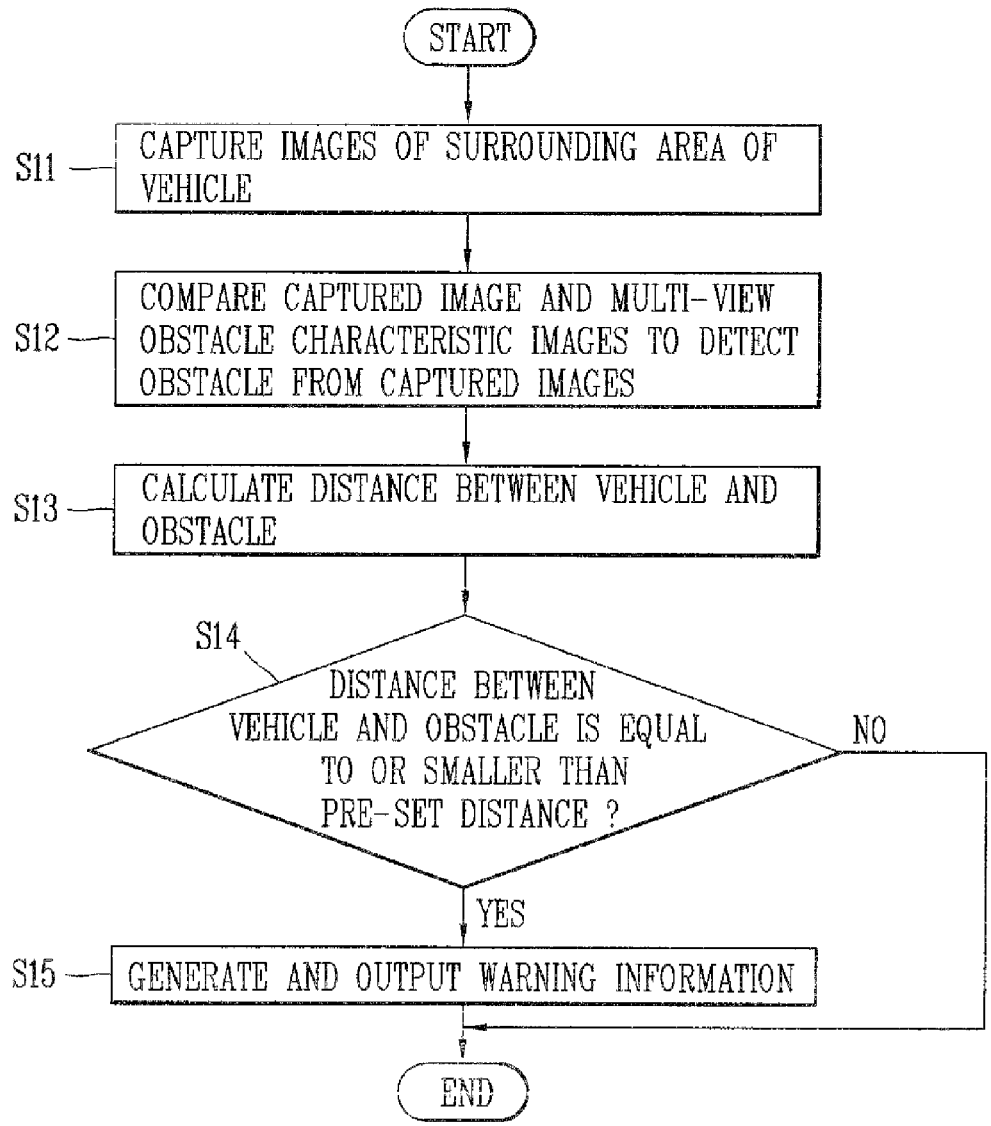
FIG. 7 is a flow chart illustrating a process of an image display method according to the first embodiment of the present invention.

FIG. 7 is a flow chart illustrating a process of an image display method according to the first embodiment of the present invention.

First, the image capture unit 604 captures an image of a surrounding area of a vehicle and outputs the captured image of the surrounding area to the controller 601 (step S11). When a particular key (e.g., a camera operation button) is selected by the user, the controller 601 may operate the image capture unit 604. The controller 601 receives vehicle gear shifting information through a vehicle interface, determine whether or not a reverse gear or a forward gear of the vehicle has been selected on the basis of the vehicle gear shifting information, and operate the rear camera 6-2 of the vehicle to capture a rear image when the reverse gear has been selected or automatically operate the front camera 6-1 to capture a front image when the forward gear of the vehicle has been selected.

Figure 8:
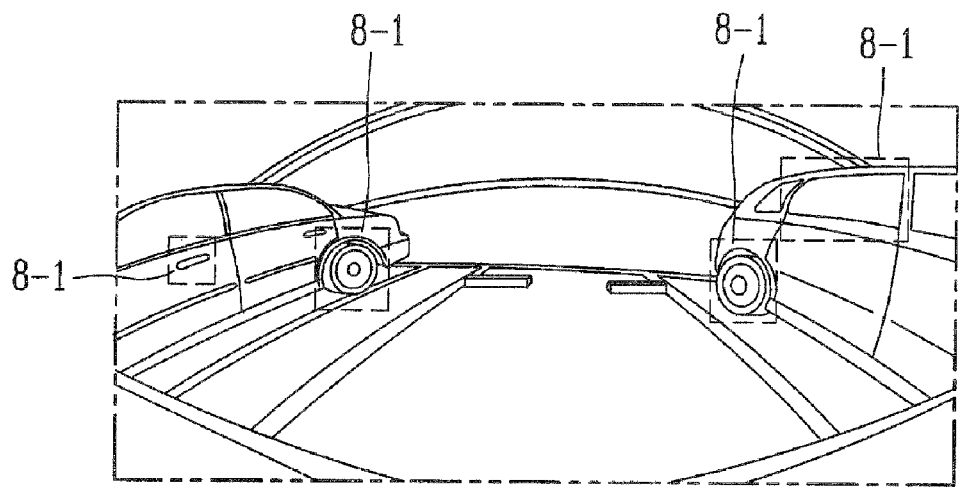
FIG. 8 is a view showing an image captured by an image capture unit according to the first embodiment of the present invention.

FIG. 8 is a view showing an image captured by an image capture unit according to the first embodiment of the present invention.

As shown in FIG. 8, the image of the surrounding area captured by the image capture unit 604 may include characteristic images 8-1 (e.g., an image of the wheel of the vehicle, an image of a side mirror of the vehicle, an image of a window of the vehicle, an image of a bumper of the vehicle, an image of a handle of the vehicle door, an image of a vehicle number plate, and the like) of an adjacent vehicle.

The controller 601 receives the images (e.g., the images in four directions) output from the image capture unit 604, and detects obstacles from the received images on the basis of the received images and the obstacle characteristic images previously captured from multiple viewpoints (step S12). For example, the controller 601 compares the images (e.g., the images in the four directions) output from the image capture unit 604 with the vehicle characteristic images previously captured from multiple viewpoints and determines characteristic images (e.g., an image of the wheel of the vehicle, an image of a side mirror of the vehicle, an image of a window of the vehicle, an image of a bumper of the vehicle, an image of a handle of the vehicle door, an image of a vehicle number plate, and the like) of the vehicle detected from the received images, as obstacles.

The controller 601 may detect objects from the images through a related art object (a vehicle, a human body, and the like) recognition program, and determine the detected objects as obstacles. Also, when an object is not detected from the images through the related art object recognition program, the controller 601 may perform step S12. For example, when a user (or a driver) attempt to park a vehicle in a parking lot, if a portion of an adjacent vehicle is blocked by the pillar of a building, or the like, the adjacent vehicle cannot be recognized through the related art object (a vehicle, a human body, or the like) recognition program. In this case, the controller may perform step S12.

The controller 601 calculates distances between the vehicle (the position of the camera mounted on the vehicle may be regarded to be identical to the position of the vehicle) and the respective obstacles (step S13). Here, the method of detecting the distances between the camera and the subjects whose images have been captured by the camera is a known art, so a detailed description thereof will be omitted.

The controller 601 determines whether or not the distance values between the vehicle and the obstacles are equal to or smaller than a pre-set distance value (step S14).

When the distance values between the vehicle and the obstacles are equal to or smaller than the pre-set distance value, the controller 601 generates warning information (e.g., a warning message and/or a warning sound, a warning image, or the like) and outputs the generated warning information to the output unit 603 (step S15). For example, the controller 601 may display a warning message and/or a warning image of Risk of collision on the display unit 603, and output the same through a warning voice speaker (not shown). The output unit 603 may include a speaker and/or a display unit.

Figure 9:
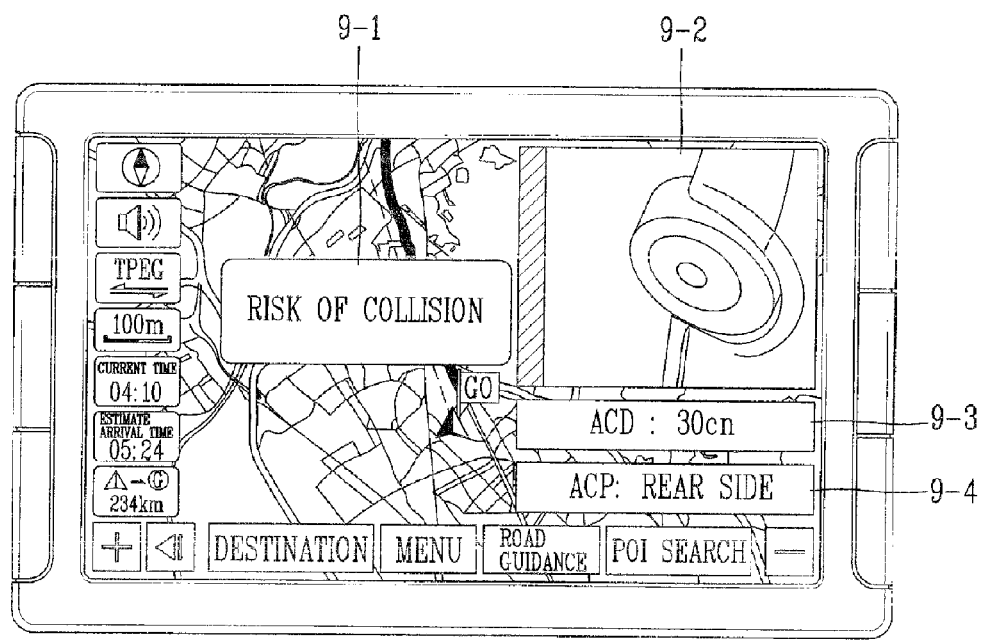
FIG. 9 is a view showing warning information displayed on a display unit according to the first embodiment of the present invention.

FIG. 9 is a view showing warning information displayed on a display unit according to the first embodiment of the present invention.

As illustrated in FIG. 9, when the distance value between the vehicle and the obstacle (e.g., a wheel of an adjacent vehicle) is equal to or smaller than the pre-set distance value, the controller 601 generates a warning message 9-1, and displays the generated warning message 9-1 on the display unit 603.

When a distance value between the obstacle detected from a first image (e.g., an image captured by the first camera) among the images in the four directions input from the image capture unit 604 and the vehicle is equal to or smaller than the pre-set distance value, the controller 601 displays a first image 9-2 on the display unit 603. Here, when the distance value between the vehicle and the obstacle is equal to or smaller than the pre-set distance value, the controller 601 may display a distance value (a collision anticipation distance, CAD) 9-3 between the vehicle and the obstacle on the display unit 603.

When the image corresponding to the area in which the distance between the vehicle and the obstacle is equal to or smaller than the pre-set distance value is an image input from the front camera (the second camera), the controller 601 may display a collision anticipation position (CAP) (the rear side) 9-4 on the display unit 603.

When the image corresponding to the area in which the distance between the vehicle and the obstacle is equal to or smaller than the pre-set distance value is an image input from the front camera (the first camera), the controller 601 may display a collision anticipation position (the front side) on the display unit 603. When the image corresponding to the area in which the distance between the vehicle and the obstacle is equal to or smaller than the pre-set distance value is an image input from the left camera (the third camera), the controller 601 may display a collision anticipation position (the left side) on the display unit 603. When the image corresponding to the area in which the distance between the vehicle and the obstacle is equal to or smaller than the pre-set distance value is an image input from the right camera (the fourth camera), the controller 601 may display a collision anticipation position (the right side) on the display unit 603.

When a plurality of obstacle characteristic images are detected from the captured images, the controller 601 may display an obstacle characteristic image closest to the vehicle, among the plurality of obstacle characteristic images, as the warning information on the display unit 603. The controller 601 may display the position of the closest obstacle characteristic image (e.g., any one of the front side, rear side, the left side, and the right side of the vehicle) and the distance between the vehicle and the closest obstacle characteristic image, as well as the closest obstacle characteristic image, on the display unit 603.

Meanwhile, when a virtual parking line is displayed on the display unit 603 on the basis of a rotation angle of a steering wheel of the vehicle and a running direction (a forward movement or a backward movement), the controller 601 may display a virtual parking line avoiding the obstacle included in the distorted images captured by the wide angle cameras on the display unit 603.

Thus, in the image display device and method thereof according to the first embodiment of the present invention, by detecting the distances between the obstacles included in the distorted images captured by the wide angle cameras and the vehicle, an occurrence of an accident in which the vehicle collides with the obstacle and is damaged can be prevented.

Also, in the image display device and method thereof according to the first embodiment of the present invention, by detecting the distances between the obstacles included in the distorted images captured by the wide angle cameras and the vehicle, a stable, reliable parking system can also be provided to the user.

An image display device and method thereof according to a second embodiment of the present invention will be described with reference to FIGS. 5 to 10.

Figure 10:
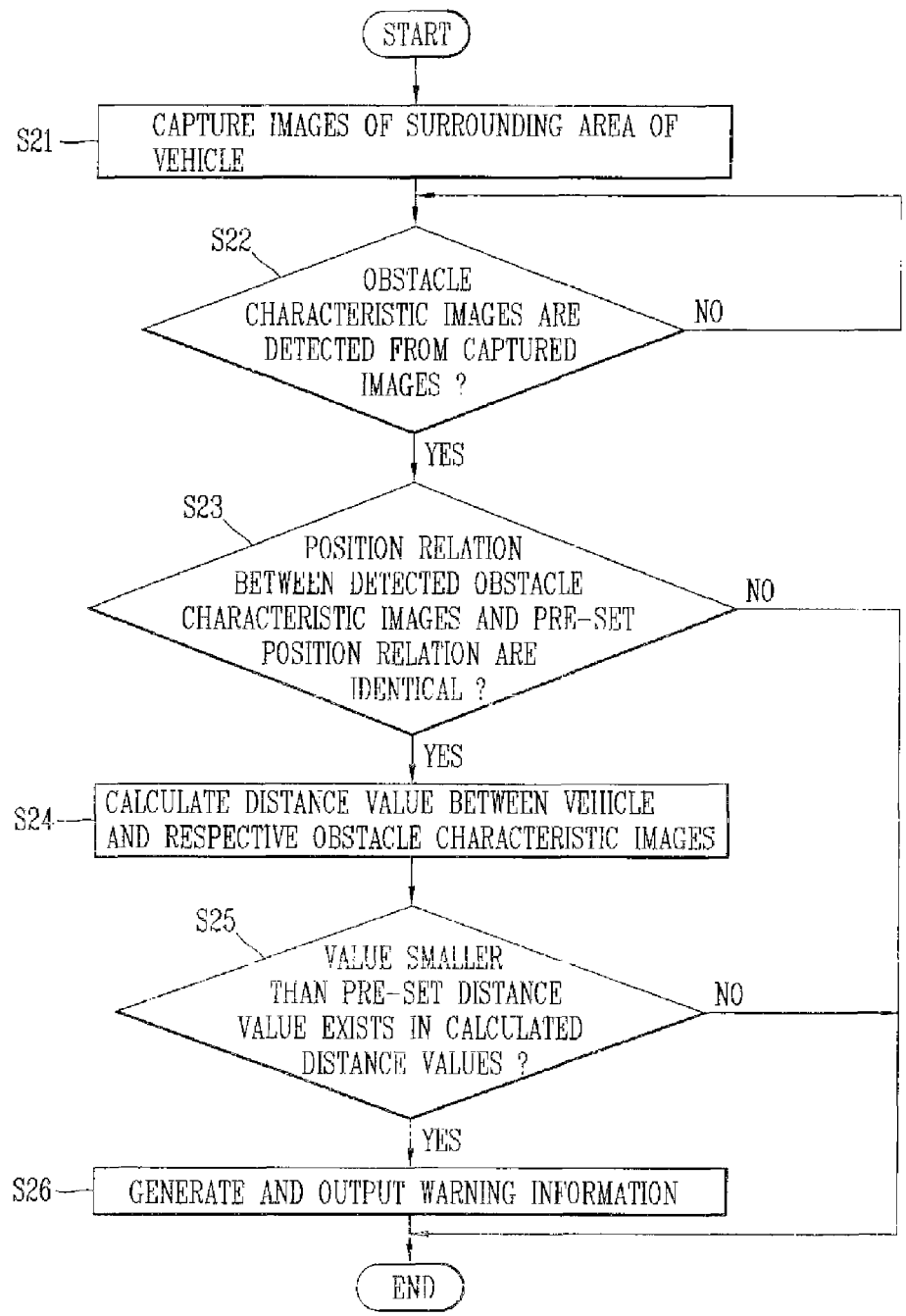
FIG. 10 is a flow chart illustrating a process of an image display method according to a second embodiment of the present invention.

FIG. 10 is a flow chart illustrating a process of an image display method according to a second embodiment of the present invention.

First, the image capture unit 604 captures an image of a surrounding area of a vehicle, and outputs the captured image of the surrounding area to the controller 601 (step S21). When a particular key (e.g., a camera operation button) is selected by the user, the controller 601 may operate the image capture unit 604. The controller 601 receives vehicle gear shifting information through a vehicle interface, determine whether or not a reverse gear or a forward gear of the vehicle has been selected on the basis of the vehicle gear shifting information, and operate the rear camera 6-2 of the vehicle to capture a rear image when the reverse gear has been selected or automatically operate the front camera 6-1 to capture a front image when the forward gear of the vehicle has been selected.

The image of the surrounding area captured by the image capture unit 604 may include characteristic images 8-1 (e.g., an image of the wheel of the vehicle, an image of a side mirror of the vehicle, an image of a window of the vehicle, an image of a bumper of the vehicle, an image of a handle of the vehicle door, an image of a vehicle number plate, and the like) of an adjacent vehicle.

The controller 601 receives the images (e.g., the images in four directions) output from the image capture unit 604, detects obstacle characteristic image(s) previously captured from multiple viewpoints from the received images, and determines whether or not a plurality of the detected obstacle characteristic images are included in the received images (step S22). For example, the controller 601 compares the images output from the image capture unit 604 with the vehicle characteristic images previously captured from multiple viewpoints and detects characteristic images (e.g., an image of the wheel of the vehicle, an image of a side mirror of the vehicle, an image of a window of the vehicle, an image of a bumper of the vehicle, an image of a handle of the vehicle door, an image of a vehicle number plate, and the like) of the nearby vehicle included in the received images, as obstacles. The images output from the image capture unit 604 may include any one or more of the image of the wheel of the adjacent vehicle, the image of a side mirror of the vehicle, the image of a window of the vehicle, the image of a bumper of the vehicle, the image of a handle of the vehicle door, and the image of a vehicle number plate. The controller 601 may detect an object from the images through a related art object (an obstacle such as a vehicle, a human body, and the like) recognition program, and determine the detected object as an obstacle. Also, when an object is not detected from the images through the related art object recognition program, the controller 601 may perform step S22.

When the obstacle characteristic images previously captured from multiple viewpoints are detected from the images output from the image capture unit 604, the controller 601 determines whether or not a position relation between the detected obstacle characteristic images is identical to a pre-set position relation (step S23). For example, when the wheel of the vehicle and the handle of the vehicle door previously captured from multiple viewpoints are detected from the images output from the image capture unit 604, the controller 601 determines whether or not a position relation between the vehicle wheel and the handle of the vehicle door is identical to the pre-set position relation. Namely, the controller 601 may determine whether or not the vehicle wheel is located at a position lower than that of the handle of the vehicle door, determine whether or not the vehicle wheel is spaced apart from the handle of the vehicle door by a pre-set distance, or determine whether or not the position relation between the vehicle wheel and the handle of the vehicle door is identical to the pre-set position relation through combination thereof. The pre-set position relation may be changed according to a type of a vehicle.

When the position relation between the detected obstacle characteristic images is identical to the pre-set position relation, the controller 601 determines the detected obstacle characteristic images as obstacles, respectively, and calculates distances between the vehicle (the positions of the cameras mounted on the vehicle may be considered to be identical to the location of the vehicle) and the respective obstacles (step S24).

The controller 601 determines whether or not calculated distance values are equal to or smaller than the pre-set distance values (step S25). For example, the controller 601 selects the smallest distance value from among the calculated distance values, and determine whether or not the smallest distance value is equal to or smaller than the pre-set distance value.

When the distance values between the vehicle and the obstacles are equal to or smaller than the pre-set distance value, the controller 601 generates warning information (e.g., a warning message and/or a warning sound, a warning image, or the like) and outputs the generated warning information to the output unit 603 (step S26). For example, the controller 601 may display a warning message and/or a warning image of Risk of collision on the display unit 603, and output the same through a warning voice speaker (not shown). The output unit 603 may include a speaker and/or a display unit.

Meanwhile, when a virtual parking line is displayed on the display unit 603 on the basis of a rotation angle of a steering wheel of the vehicle and a running direction (a forward movement or a backward movement), the controller 601 may detect a position relation between obstacles included in the distorted images captured by the wide angle cameras and display a virtual parking line avoiding the obstacle on the display unit 603.

Thus, in the image display device and method thereof according to the second embodiment of the present invention, by detecting the position relation between the obstacle characteristic images included in the distorted images captured by the wide angle cameras, obstacles can be accurately detected from the distorted images.

Also, in the image display device and method thereof according to the second embodiment of the present invention, by detecting the position relation between the obstacle characteristic images included in the distorted images captured by the wide angle cameras to accurately detect obstacles from the distorted image, the distances between the obstacles and the vehicle can be accurately detected.

In addition, in the image display device and method thereof according to the second embodiment of the present invention, by detecting the distances between the obstacles included in the distorted images captured by the wide angle cameras and the vehicle, a stable, reliable parking system can be provided.

An image display device and method thereof according to a third embodiment of the present invention will be described with reference to FIGS. 5 to 12.

Figure 11:
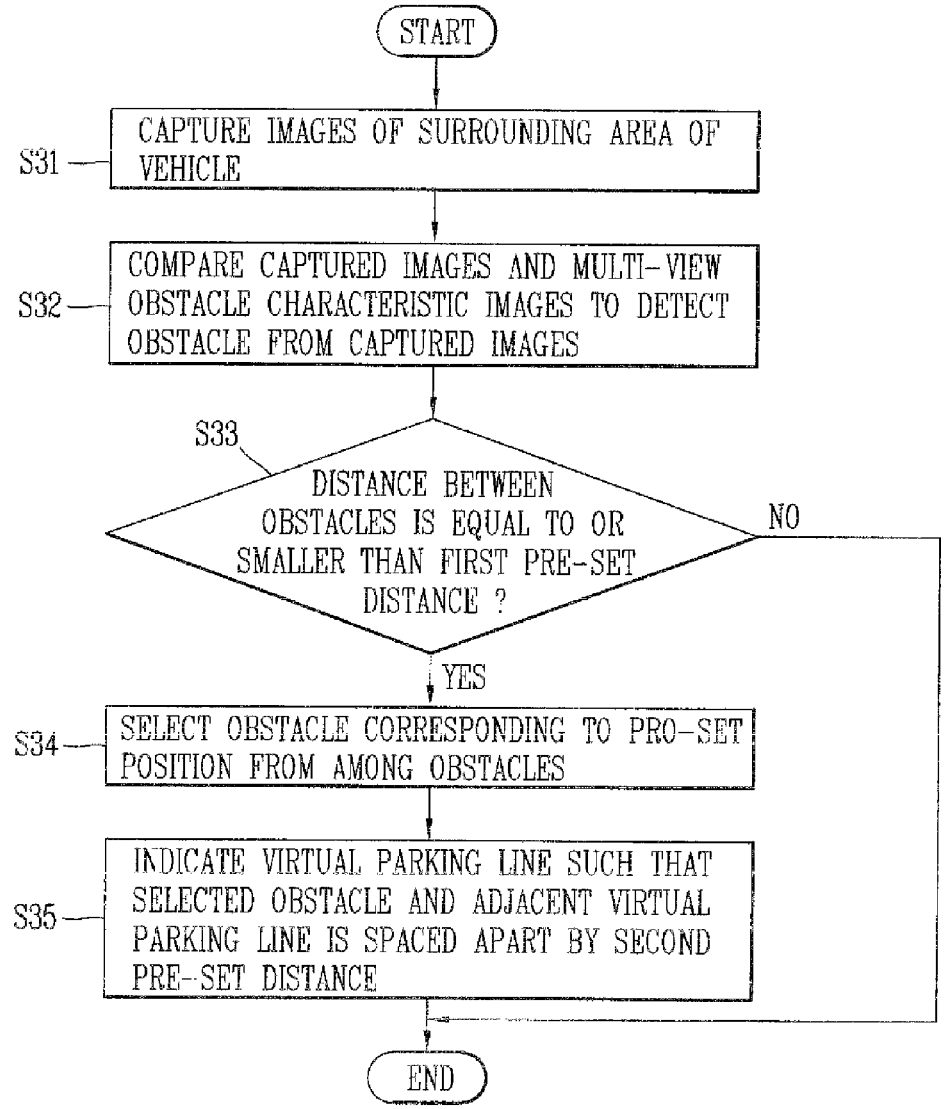
FIG. 11 is a flow chart illustrating a process of an image display method according to a third embodiment of the present invention.

FIG. 11 is a flow chart illustrating a process of an image display method according to a third embodiment of the present invention.

First, the image capture unit 604 captures an image of a surrounding area of a vehicle and outputs the captured image of the surrounding area to the controller 601 (step S31). When a particular key (e.g., a camera operation button) is selected by the user, the controller 601 may operate the image capture unit 604. The controller 601 receives vehicle gear shifting information through a vehicle interface, determine whether or not a reverse gear or a forward gear of the vehicle has been selected on the basis of the vehicle gear shifting information, and operate the rear camera 6-2 of the vehicle to capture a rear image when the reverse gear has been selected or automatically operate the front camera 6-1 to capture a front image when the forward gear of the vehicle has been selected.

The controller 601 receives the images (e.g., the images in four directions) output from the image capture unit 604, and detects obstacles from the received images on the basis of the received images and the obstacle characteristic images previously captured from multiple viewpoints (step S32). For example, the controller 601 compares the images (e.g., the images in the four directions) output from the image capture unit 604 with the vehicle characteristic images previously captured from multiple viewpoints and determines characteristic images (e.g., an image of the wheel of the vehicle, an image of a side mirror of the vehicle, an image of a window of the vehicle, an image of a bumper of the vehicle, an image of a handle of the vehicle door, an image of a vehicle number plate, and the like) of the vehicle detected from the received images, as obstacles. The images output from the image capture unit 604 may include a plurality of adjacent vehicles, so a plurality of obstacles may be detected. Thus, when the position relation between the detected obstacle characteristic images is identical to a pre-set position relation, the controller 601 recognizes the obstacle characteristic images whose position relation is identical, as a first obstacle (e.g., a first vehicle). Besides the first obstacle (e.g., the first vehicle), when obstacle characteristic images whose position relation is identical are further detected, the controller 601 recognizes the further detected obstacle characteristic images as a second obstacle (e.g., a second vehicle).

When the reverse gear of the vehicle is selected or a parking icon is selected by the user, the controller determines whether or not a distance between the first obstacle and the second obstacle is greater than a first pre-set distance (S33). The first pre-set distance is a distance required for the vehicle to park, which may include a distance required for a breadth of the vehicle or a distance required for a passenger or a driver to get into or get out of the vehicle.

When the distance between the first obstacle and the second obstacle is greater than the first pre-set distance, the controller 601 selects an obstacle corresponding to a pre-set position from among the first and second obstacles (step S34). For example, when the distance between the first obstacle and the second obstacle is greater than the first pre-set distance, the controller 601 selects an obstacle closest to the door (e.g., the door of the driver s seat and the door of a passenger seat (i.e., the back seat) positioned in the direction of the driver), rather than the door positioned in the direction of the passenger seat of the vehicle, from among the first and second obstacles.

The controller 601 displays a virtual parking line on the captured image such that a distance between the selected obstacle and the adjacent virtual parking line is spaced apart by the second pre-set distance.

Figure 12:
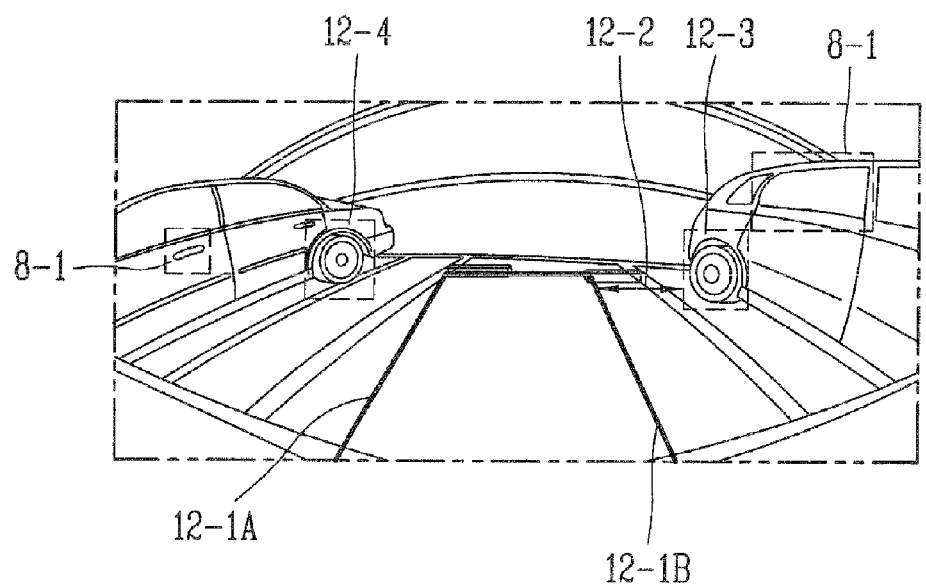
FIG. 12 is a view showing a parking line displayed on the display unit according to the third embodiment of the present invention.

FIG. 12 is a view showing a parking line displayed on the display unit according to the third embodiment of the present invention.

As shown in FIG. 12, when a distance 12-2 between a first obstacle 12-3 and a second obstacle 12-4 is greater than a pre-set first distance, the controller 601 selects the obstacle 12-3 corresponding to a pre-set location among the first obstacle 12-3 and the second obstacle 12-4. For example, the controller 601 selects the obstacle 12-3 which is the most adjacent to the door of the driver's seat of the vehicle (i.e., the door by which the driver is get into or get out of the vehicle) from among the first obstacle 12-3 and the second obstacle 12-4. In order to secure space allowing the driver to get into or get out of the vehicle, the controller 601 displays a virtual parking line such that the selected obstacle 12-3 and the adjacent virtual parking line 12-1B is spaced apart by a second pre-set distance. The virtual parking line includes a first line 12-1A and a second line 12-1B.

Thus, in the image display apparatus and method thereof according to the third embodiment of the present invention, the distance between the obstacles included in the distorted images captured by the wide angle cameras is detected and the virtual parking line for securing space allowing the user (or the driver) to get into or get out of the vehicle through the door(s) (e.g., the door of the driver's seat and the door of the back seat of the driver's seat positioned in the direction of the driver), rather than through the door(s) positioned in the direction of the passenger's seat of the vehicle, is displayed, whereby a stable, reliable parking system can be provided to the user (or the driver).

As described above, in the image display device and method according to embodiments of the present invention, a distance between an obstacle included in distorted images captured by wide angle cameras and a vehicle is detected, whereby an occurrence of an accident in which the vehicle collides with the obstacle so as to be damaged can be prevented.

In the image display device and method according to embodiments of the present invention, a distance between an obstacle included in distorted images captured by wide angle cameras and a vehicle is detected, whereby a stable, reliable parking system can be provided to a user.

In the image display device and method according to embodiments of the present invention, a position relation between obstacle characteristic images included in distorted images captured by wide angle cameras is detected, whereby an obstacle can be precisely detected from the distorted images.

In the image display device and method according to embodiments of the present invention, a position relation between obstacle characteristic images included in distorted images captured by wide angle cameras is detected to precisely detect an obstacle from the distorted images, whereby a distance between the obstacle and the vehicle can be precisely detected.

In the image display device and method according to embodiments of the present invention, the distance between the obstacles included in the distorted images captured by the wide angle cameras is detected and the virtual parking line securing a space allowing the user (or the driver) to get into or get out of the vehicle through the door(s) (e.g., the door of the driver's seat and the door of the back seat of the driver's seat positioned in the direction of the driver), rather than through the door(s) positioned in the direction of the passenger's seat of the vehicle, is displayed, whereby a stable, reliable parking system can be provided to the user (or the driver).

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:
1. An image display device comprising:
  a display unit
  an image capture unit; and
  at least one processor configured to:
    control the image capture unit to capture images of a surrounding area of a vehicle;
    detect an obstacle based on the captured images; and
    output warning information to the display unit based on a distance value between the vehicle and the obstacle being equal to or smaller than a first distance value,
  wherein the at least one processor is configured to output the warning information to the display unit based on the distance value between the vehicle and the obstacle being equal to or smaller than the first distance value by:
    detecting a plurality of obstacles from the captured images;
    calculating a plurality of distance values between the vehicle and the detected plurality of obstacles; and
    outputting the warning information to the display unit based on the smallest distance value among the calculated plurality of distance values being equal to or smaller than the first distance value.

2. The image display device of claim 1, wherein the at least one processor is further configured to output the warning information to the display unit based on the distance value between the vehicle and the obstacle being equal to or smaller than the first distance value by:
    detecting a plurality of obstacle characteristic images from the captured images, and
    based on the detected plurality of obstacle images, outputting, as the warning information on the display unit, an obstacle characteristic image which is the most adjacent to the vehicle among the plurality of obstacle characteristic images.

3. The image display device of claim 2, wherein the at least one processor is further configured to display a position of the most adjacent obstacle characteristic image and a distance between the vehicle and the most adjacent obstacle characteristic image on the display unit.

4. The image display device of claim 1, wherein the at least one processor is further configured to:
    determine a virtual parking line that avoids the obstacle based on a rotation angle of the wheel of the vehicle and a traveling direction, and
    output the virtual parking line on the display unit.

5. The image display device of claim 1, wherein the at least one processor is further configured to:
    detect obstacle characteristic images from the captured images;
    determine that a position relation between the detected obstacle characteristic images satisfies a first position relation; and
    based on the determination that the position relation between the detected obstacle characteristic images satisfies the first position relation, determine the detected obstacle characteristic images as obstacles.

6. The image display device of claim 1, wherein the at least one processor is further configured to:
    detect a first obstacle and a second obstacle from the captured images,
    based on a distance between the first obstacle and the second obstacle being greater than a second distance, select an obstacle corresponding to a first position from among the first obstacle and the second obstacle, and
    display a virtual parking line on the captured image such that the selected obstacle and the virtual parking line adjacent to the selected obstacle are spaced apart by a third distance.

7. The image display device of claim 6, wherein the second distance comprises a breadth of the vehicle and a distance required for a passenger or a driver to get into or get out of the vehicle.

8. The image display device of claim 6, wherein the obstacle corresponding to the first position is an obstacle which is most adjacent to a door of the vehicle, among the first obstacle and the second obstacle.

9. An image display method comprising:
    capturing images of a surrounding area of a vehicle through an image capture unit;
    detecting an obstacle based on the captured images; and
    outputting warning information based on a distance value between the vehicle and the obstacle being equal to or smaller than a first distance value,
    wherein outputting the warning information based on the distance value between the vehicle and the obstacle being equal to or smaller than the first distance value comprises:
        detecting a plurality of obstacles from the captured images;
        calculating a plurality of distance values between the vehicle and the detected plurality of obstacles; and
        outputting the warning information based on the smallest distance value among the calculated plurality of distance values being equal to or smaller than the first distance value.

10. The method of claim 9, wherein the captured images are images captured by wide angle cameras.

11. The method of claim 9, wherein outputting the warning information further comprises:
    detecting a plurality of obstacle characteristic images from the captured images, and
    based on the plurality of obstacle characteristic images detected from the captured images, outputting, as the warning information on a display unit, an obstacle characteristic image which is the most adjacent to the vehicle among the plurality of obstacle characteristic images.

12. The method of claim 11, further comprising:
    displaying a position of the most adjacent obstacle characteristic image and a distance between the vehicle and the most adjacent obstacle characteristic image on a display unit.

13. The method of claim 9, further comprising:
    determining a virtual parking line that avoids the obstacle based on a rotation angle of the wheel of the vehicle and a traveling direction, and
    outputting the virtual parking line avoiding the obstacle on a display unit.

14. The method of claim 9, wherein detecting the obstacle based on the captured images comprises:
    detecting obstacle characteristic images from the captured images;
    determining that a position relation between the detected obstacle characteristic images satisfies a first position relation; and
    based on the determination that the position relation between the detected obstacle characteristic images satisfies the first position relation, determining the detected obstacle characteristic images as obstacles.

15. The method of claim 9, further comprising:
    detecting a first obstacle and a second obstacles from the captured images;
    based on a distance between the first obstacle and the second obstacle being greater than a second distance, selecting an obstacle corresponding to a first position from among the first obstacle and the second obstacle; and
    displaying a virtual parking line on the captured image such that the selected obstacle and the virtual parking line adjacent to the selected obstacle are spaced apart by a third distance.

16. The method of claim 15, wherein the second distance comprises a breadth of the vehicle and a distance required for a passenger or a driver to get into or get out of the vehicle.

17. The method of claim 15, wherein the obstacle corresponding to the first position is an obstacle which is most adjacent to a door of the vehicle, among the first obstacle and the second obstacle.

18. The image display device of claim 1, further comprising a speaker configured to output the warning information.

19. The image display device of claim 1, wherein the warning information comprises at least one of a message related to a warning, a sound related to a warning, a first image related to a warning, or a second image received from the image capture unit.

20. The image display device of claim 1, wherein the warning information comprises at least one of a preset message, information related to the smallest distance value among the calculated plurality of distance values, or information related to a collision anticipation position.

21. The image display device of claim 1, wherein the image capture unit comprises at least one of a first camera provided on a front side of the vehicle, a second camera provided on a rear side of the vehicle, a third camera provided on a left side of the vehicle, or a fourth camera provided on a right side of the vehicle.

22. The image display device of claim 21, wherein the warning information comprises an image received from one of the first camera, the second camera, the third camera, or the fourth camera.

23. The image display device of claim 22, wherein the one of the first camera, the second camera, the third camera, or the fourth camera is a camera configured to capture the closest obstacle among the plurality of obstacles.

24. The image display device of claim 21, wherein the at least one processor is configured to control the display unit to display images received from at least one of the first camera, the second camera, the third camera, or the fourth camera.

25. The image display device of claim 21, wherein the at least one processor is further configured to:
determine that a gear of the vehicle is a reverse gear; and
control the second camera provided on the rear side of the vehicle based on the determination that the gear of the vehicle is the reverse gear.

26. The image display device of claim 21, wherein the at least one processor is further configured to:
determine that a gear of the vehicle is a reverse gear; and
output, on the display unit, an image received from the second camera based on the determination that the gear of the vehicle is the reverse gear.

27. The image display device of claim 26, wherein the at least one processor is configured to:
determine a rotation of a steering wheel of the vehicle; and
control the display unit to display, on the image received from the second camera, a first image that is varied by the determined rotation of the steering wheel of the vehicle.

28. The image display device of claim 21, wherein the at least one processor is configured to:
determine that a gear of the vehicle is a forward gear; and
control the first camera provided on the front side of the vehicle based on the determination that the gear of the vehicle is the forward gear.

29. The image display device of claim 21, wherein the at least one processor is further configured to:
determine that a gear of vehicle is a forward gear; and
display, on the display unit, an image received from the first camera based on the determination that the gear of the vehicle is the forward gear.

30. The image display device of claim 29, wherein the at least one processor is configured to:
determine a rotation of a steering wheel of the vehicle; and
control the display unit to display, on the image received from the second camera, a first image that is varied by the determined rotation of the steering wheel of the vehicle.

31. The image display device of claim 21, wherein the at least one processor is configured to control the display unit to display an image received from a camera mounted on the front side of the vehicle and images received from the first camera, the second camera, the third camera, and the fourth camera.

32. The image display device of claim 21, wherein the at least one processor is configured to control the display unit to display an image received from a camera mounted on the rear side of the vehicle and images received from the first camera, the second camera, the third camera, and the fourth camera.

33. The image display device of claim 21, further comprising an input button linked to a function related to an operation of the image capture unit,
wherein the at least one processor is configured to control at least one of the first camera, the second camera, the third camera, or the fourth camera to operate based on detecting a user selection of the input button.

* * * * *